No. 736,852.

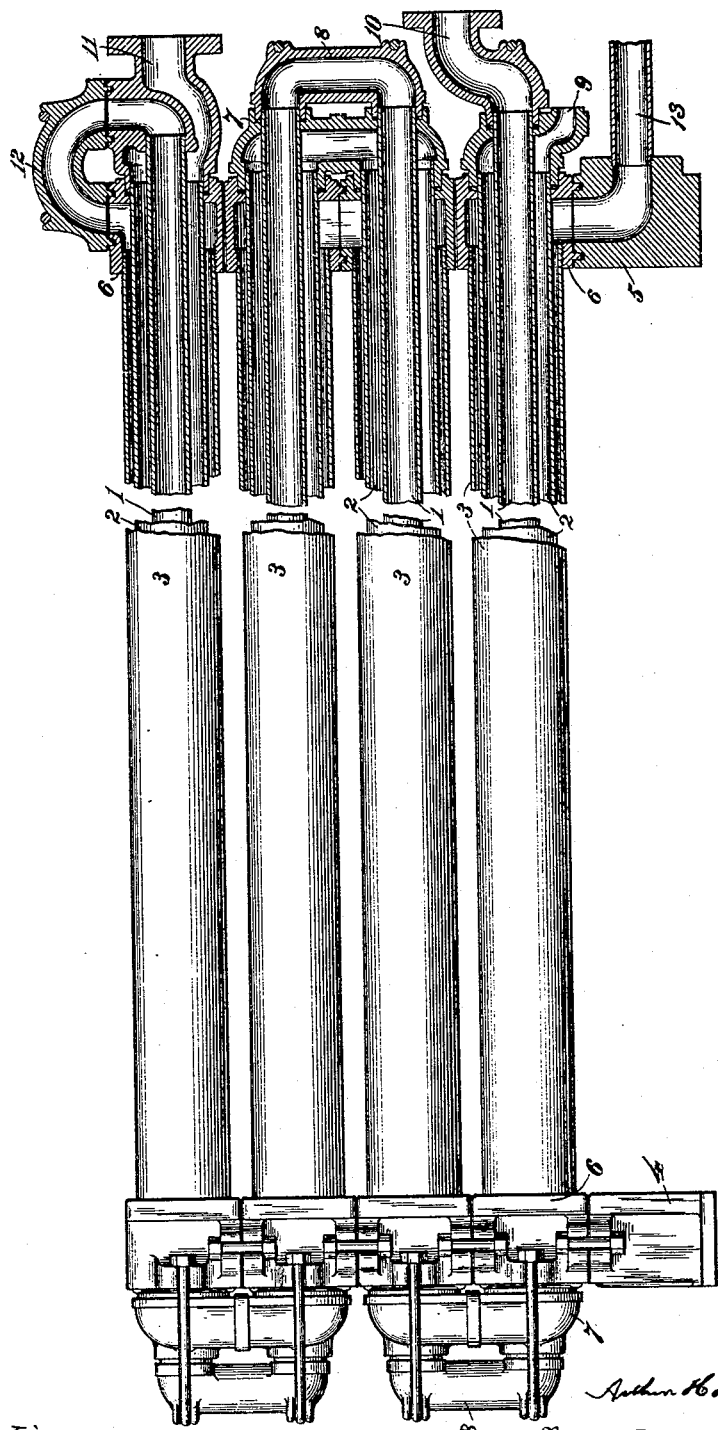

Patented August 18, 1903.

UNITED STATES PATENT OFFICE.

ARTHUR H. HUTCHINSON, OF WAYNESBORO, PENNSYLVANIA, ASSIGNOR TO FRICK COMPANY, OF WAYNESBORO, PENNSYLVANIA, A CORPORATION.

BRINE-COOLER.

SPECIFICATION forming part of Letters Patent No. 736,852, dated August 18, 1903.

Application filed December 5, 1901. Serial No. 84,805. (No model.)

*To all whom it may concern:*

Be it known that I, ARTHUR H. HUTCHINSON, a citizen of the United States, residing at Waynesboro, in the county of Franklin and State of Pennsylvania, have invented certain new and useful Improvements in Brine-Coolers, of which the following is a specification.

My said invention relates to that class of machinery known as "coolers," and applies more particularly to that part of an ice-making or refrigerating apparatus commonly known as a "brine-cooler;" and it consists in certain novel arrangements in the form and construction of such part, whereby great economy is secured in the operation of the device and also in the space required for its accommodation in the plant, all as will be hereinafter more fully described and claimed.

The accompanying drawing, which forms a part hereof, and on which similar reference-numerals indicate similar parts, represents one of my improved brine-coolers partly in section and partly in elevation, its central portion being broken out in order to permit the parts to be shown on a larger scale.

Said apparatus consists of a "coil" of three pipes concentrically arranged and connected by suitable fittings through which communication is established from one pipe to its corresponding pipe in the adjacent series and at the top from the outside pipe to the inside pipe of the coil. The several fittings are connected by tongue-and-groove joints containing suitable packing, whereby the joints are all rendered perfectly tight by means of the various suitable clamping-bolts, as shown, or any suitable character of joint or fitting to accomplish the purpose may be used.

I have marked the center pipe 1, the middle pipe 2, and the outside pipe 3. A foot or base 4 at one end and 5 at the other end support the apparatus. Pipe 3 screws into or is otherwise secured in the inner ends of fittings 6, which are hollow and have smaller apertures at their outer ends, within which are tightly fitted the ends of pipes 2. A second fitting 7 is secured outside fitting 6, having a still smaller aperture in its outer end, within which the end of the center pipe 1 is tightly secured. Except at the inlet and discharge ends a third fitting 8 is secured over the ends of said center pipes, connecting one to the next. Communication from the space between the pipes 2 and 3 in one series of pipes to the next is established through fittings 6 at alternate ends of the pipes and between the next spaces through the fittings 7 and between the center pipes through the fittings 8. At the lower end the brine-inlet is provided through base 5, which is formed hollow and connected with the lower fitting 6. The ammonia-inlet is established through a fitting 9 on the outer end of the lower fitting 6 and the brine-outlet through a fitting 10 on the outer end of said fitting 9, with which the lower center pipe communicates. At the top of the apparatus a fitting 11 is attached to the outer end of top fitting 6, which contains a way leading from the space between pipes 1 and 2 for the ammonia-outlet and also a way communicating with the center pipe and leading upwardly. A return-bend fitting 12 is mounted on the top of the uppermost fitting 6 and said fitting 11, having a way which joins the outlet from said fitting 6 with said way in fitting 11, which communicates with center pipe 1, a communication between the space outside of the pipe 2 to within pipe 1 being thus established at this point.

The operation is as follows: The brine or other material to be cooled is admitted through the inlet 13 at the lower corner in base 5 into the space between the pipes 2 and 3 and flows back and forth until it reaches the top section, when it passes through the return-bend 12 into the top center pipe 1 and downward through said center pipe in the several sections until it reaches the bottom section, from whence it is discharged through fitting 10 and suitable pipes (not shown) to the freezing-tank or other part of the apparatus where its work is to be done. The ammonia is admitted through inlet 9 to space between pipes 1 and 2 and flows back and forth until it is discharged through outlet 11 at the top, to be carried through appropriate pipes (not shown) to the storage-tank, as usual. The brine, refrigerating agent, or whatever material is to be cooled is thus admitted at its highest temperature at the point where the ammonia is admitted at its lowest temperature and flows in the same direction with said ammoa through a channel surrounding the pipe containing it until the point where said ammonia is discharged is reached. It will thus be seen that the two agents are first brought into operative relation with each other at the widest difference in temperature, the result being that the comparatively warm brine at once sets the ammonia to "boiling" or evaporating or expanding, which operates to rapidly absorb the heat from said brine, raising its own temperature and lowering the temperature of said brine, with the result that when the point of ammonia discharge is reached at the top of the apparatus the temperatures of the two agents have been nearly equalized or their equalization approached. The brine or other substance being cooled now turns into the center pipe 1 and returns to the lower section of the coil within the channel containing the ammonia, flowing oppositely thereto and being constantly brought against ammonia of a decreasing temperature, which results in its temperature being rapidly lowered by the absorption of the ammonia of the heat therein, until at its discharge-point it nearly approaches in temperature that of said ammonia when introduced into the apparatus. By this arrangement, with the brine flowing on both sides of the cooling fluid all of its power of absorption is utilized and none allowed to waste, and the best possible results are secured with the least possible quantity of ammonia. The arrangement also admits of a great amount of cooling-surface in a small space, thus not only securing economy in the use of material, but in space required for the accommodation of the apparatus, both of which are of great importance.

While I have described the flow of fluid as from bottom to top and then back, it will be understood, of course, that I do not limit myself to this particular arrangement, but consider my invention as broad as defined in the following claims and that any modifications within their scope may be used without departing from said invention. It will also be understood that the term "brine-cooler" is used as the trade name for the apparatus and not to limit the same to the cooling of any particular fluid or substance.

Having thus fully described my said invention, what I claim as new, and desire to secure by Letters Patent, is—

1. In a refrigerating apparatus a "brine-cooler" comprising a coil of three or more pipes substantially concentrically arranged, the several pipes of the several sections being connected by fittings between the terminals of said coil which connect the corresponding pipes with each other to establish continuous passage-ways through them and separate said passage-ways one from the other, fittings at the inlet end of the coil having an inlet-opening to the outer passage, an inlet-opening to the intermediate passage, and a discharge-opening from the central passage, and a fitting at the opposite end which contains a discharge-opening from the intermediate passage, and a bend or way connecting the outside pipe or passage of the coil with its central pipe or passage, whereby the cooling agent is introduced at one end of the coil and flows in a continuous direction through the intermediate passage therein and is discharged at the other end, and the fluid to be cooled is introduced at the same end of the coil with said cooling agent and flows in the same direction therewith in a passage in the coil on one side of the cooling agent and at the opposite end passes into another passage of said coil on the other side of said cooling agent and from thence flows oppositely from said cooling agent and is discharged at the same end where introduced, substantially as set forth.

2. A "brine-cooler" having three or more channels one within the other, an outer channel being connected by a bend or by-pass with an inner channel at one end of the coil, the inlet to the one channel and the outlet to the other channel being at the same end of the coil, and the channel for the cooling agent being located between said other channels and having its inlet at the end of the coil where the fluid to be cooled is introduced and its outlet at the end where said fluid is turned from one channel into the other through said bend, whereby said fluid to be cooled and the cooling agent are introduced at the same bend where the cooling agent is at its lowest temperature and the fluid to be cooled is at its highest temperature and flow in the same direction until the cooling agent reaches its highest temperature, from whence the fluid to be cooled is returned to the point of entrance in a direction opposite to that of the cooling agent and is discharged at the point where said cooling agent is at its lowest temperature, substantially as set forth.

3. In a "brine-cooler" of a refrigerating apparatus, the combination of the several pipes arranged one within the other, the fittings connecting their ends between the terminals of the coils formed with communicating openings which connect the ends of the corresponding pipes of the several sections, one end of the lower section of the coil being provided with fittings which contain an inlet to the outside pipe, an inlet to the intermediate pipe, and an outlet to the central pipe, and a fitting to one end of the upper section of the coil which contains an outlet for the intermediate pipe and a by-pass or way leading from the outside pipe to the central pipe, the several sections of the coil being suitably connected and supported one above the other, whereby both the cooling agent and the fluid to be cooled are introduced into the lower section of the coil, the cooling agent is discharged from the upper section of the coil and the fluid to be cooled is discharged from the lower section of the coil flowing in one direction on one side of the cooling agent in the same direction therewith and returning in a direction opposite to the flow of said cooling agent and on the other side thereof, substantially as set forth.

In witness whereof I have hereunto set my hand and seal at Waynesboro, Pennsylvania, this 25th day of November, A. D. 1901.

ARTHUR H. HUTCHINSON. [L. S.]

Witnesses:
A. O. FRISK,
ALF. N. RUSSELL.